United States Patent [19]

Polmanteer

[11] 4,395,462

[45] Jul. 26, 1983

[54] FLUOROELASTOMER COATED SILICONE RUBBER

[75] Inventor: Keith E. Polmanteer, Weidman, Mich.

[73] Assignee: Dow Corning Corporation, Midland, Mich.

[21] Appl. No.: 416,805

[22] Filed: Sep. 13, 1982

[51] Int. Cl.³ .............................................. B32B 25/20
[52] U.S. Cl. .................................. 428/420; 428/422; 428/447; 428/413; 428/421
[58] Field of Search ............... 428/422, 447, 420, 413, 428/421

[56] References Cited

U.S. PATENT DOCUMENTS

| | | | |
|---|---|---|---|
| 2,945,773 | 7/1960 | Panagrossi et al. | 117/138.8 |
| 3,619,256 | 11/1971 | Pepe et al. | 117/75 |
| 3,639,155 | 2/1972 | Hartlein et al. | 117/138.8 A |
| 3,967,042 | 6/1976 | Laskin | 428/447 |
| 4,082,726 | 4/1978 | Mine et al. | 260/46.5 UA |
| 4,122,127 | 10/1978 | Mikami et al. | 260/825 |
| 4,316,941 | 2/1982 | Eguchi | 428/422 |
| 4,321,306 | 3/1982 | Eguchi | 428/422 |
| 4,323,603 | 4/1982 | Closs | 524/545 |
| 4,332,844 | 6/1982 | Hamada et al. | 427/387 |
| 4,338,376 | 7/1982 | Kritzler | 428/422 |
| 4,361,608 | 11/1982 | Furukawa | 428/421 |

FOREIGN PATENT DOCUMENTS

| | | | |
|---|---|---|---|
| 54-3127 | 1/1979 | Japan | 428/447 |
| 1092857 | 3/1968 | United Kingdom | 428/447 |

OTHER PUBLICATIONS

R. G. Arnold et al., *Rubber Chemistry & Technology*, 46, pp. 619–652.
R. A. Brullo and R. R. Campbell, *Elastomers*, Apr. 1980, pp. 47–51.

*Primary Examiner*—Ellis P. Robinson
*Attorney, Agent, or Firm*—Robert Spector

[57] ABSTRACT

Silicone rubber articles that are resistant to abrasion, permeation of gases and accumulation of dirt particles have an adherant coating on at least one surface of the article. The coating is derived from a peroxide-curable fluoroelastomer gum composition which contains (1) an epoxide compound in an amount sufficient to react with the acidic by-products generated during curing of the elastomer, and (2) an organic peroxide in an amount sufficient to achieve curing of the fluoroelastomer gum at elevated temperatures.

21 Claims, No Drawings

FLUOROELASTOMER COATED SILICONE RUBBER

The Government has rights in this invention pursuant to Prime Contract No. DAAK11-77-C-0071 awarded by the Department of the Army.

BACKGROUND OF THE INVENTION

This invention relates to coated silicone rubber articles, and more particularly to coatings of fluorocarbon elastomers that impart abrasion resistance, a reduced level of gas permeability and other desirable properties to silicone rubber substrates.

The prior art discloses coating silicone rubber with various materials for the purpose of imparting desirable properties or eliminating undesirable properties inherent in the rubber. U.S. Pat. No. 3,639,155, issued to R. C. Hartlein and H. L. Vincent on Feb. 1, 1972 teaches that the tendency of silicone rubbers to accumulate tenaciously adhering dirt particles from the surrounding environment can be eliminated by coating the rubber with a room temperature vulcanizable block copolymer containing three specified types of organosiloxane repeating units. In addition to preserving the initially attractive appearance of the silicone rubber, many of the cured coatings are more resistant to abrasion and degradation by certain chemical agents, particularly strong acids and bases, than the underlying rubber.

The coatings disclosed in the aforementioned Hartlein et al. patent are less than satisfactory for some applications, for example those during which a silicone rubber is exposed to organic solvents, particularly strong acids and bases, or when it is desired to reduce the permeability of silicone rubber to oxygen or other gases.

Of the numerous types of organic polymers that have been used as coating materials for various metallic and nonmetallic substrates, those derived from ethylenically unsaturated fluorocarbons such as tetrafluoroethylene, vinylidene fluoride and hexafluoropropylene have been shown to be among the most resistant to abrasion and destruction by chemical agents. In addition, the vapor permeability of these polymers is relatively low compared to polyorganosiloxanes. Another inherent characteristic of fluorocarbon polymers, including elastomers, derived from vinylidene fluoride and/or hexafluoropropylene, is their resistance to "wetting" by water, most organic solvents, and adhesives of almost every type. These physical and chemical properties of fluorocarbon elastomers, also referred to as fluoroelastomers, make them ideal candidates for protective coatings on silicone rubber articles requiring oxidative stability, resistance to high temperature abrasion, and/or chemicals which dissolve or degrade many other types of synthetic organic polymers.

Since about 1950 numerous ethylenically unsaturated fluorine-containing hydrocarbons have been incorporated into elastomeric polymers. Elastomers derived from many of these hydrocarbons, including vinylidene fluoride, hexafluoropropylene and perfluoroalkyl vinyl ethers are now commercially available from a number of suppliers. A detailed discussion of the various types of fluoroelastomers is contained in an article by R. G. Arnold, A. L. Barney and D. C. Thompson that appeared in the July, 1973 issue of a journal entitled "Rubber Chemistry and Technology" (Volume 46, pp. 619-652). A more recent article by R. A. Brullo and R. R. Campbell (Elastomers, April 1980, pp. 47-51) discloses typical fluorocarbon polymer formulations that can be cured to form elastomer products.

The polymer art employs the terms "curing," "vulcanization" and "crosslinking" to define a process during which molecules of a thermoplastic polymer, including fluoroelastomer gums, are joined together by chemical bonding to form a nonthermoplastic material. A variety of methods for curing or crosslinking fluoroelastomer gums have been employed, including reaction with peroxides, diamines, dithiols, and aromatic polyhydroxy compounds, and the use of radiation. The aforementioned article by Arnold et al. reports that all of these curing systems require the presence in the formulation of a basic metal oxide such as magnesium or calcium oxide. The basic metal oxide reacts with the acidic by-products, which are believed to include hydrogen fluoride and/or derivatives thereof, that are generated during curing (crosslinking) of the elastomer. In the absence of the basic metal oxide the by-products of the curing reaction would eventually react with the polymer and result in a gradual degradation of desirable physical properties such as hardness and tensile strength. While the basic metal oxides currently employed in fluoroelastomer gums are necessary to react with these by-products and thereby preserve the desirable physical properties of the cured elastomer, the oxides function as nonreinforcing fillers. It is known that such fillers detract from the physical properties of the unmodified elastomer. In addition, the basic metal oxide particles render the elastomer opaque and unsuitable for end use applications requiring optically clear materials.

U.S. Pat. No. 4,323,603, issued on Apr. 6, 1982 to David Close discloses replacing the basic metal oxides conventionally used as acid acceptors in conventional curable fluoroelastomer compositions with a silane of the general formula

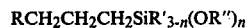

$$RCH_2CH_2CH_2SiR'_{3-n}(OR'')_n$$

wherein R is a "reactive organofunction group such as amino or epoxy," R' is alkyl containing from 1 to 5 carbon atoms and R" is alkyl containing from 1 to 4 carbon atoms. This patent teaches that cured fluoroelastomer compositions containing the aforementioned silanes adhere better to various substrates, including metal, glass and rubber, than prior art formulations containing basic metal oxides. Experimental data in this patent demonstrate that while a cured fluoroelastomer composition containing an epoxypropyl silane (identified as Z-6040, a product of the Dow Corning Corporation) in place of the basic metal oxide exhibited good to excellent adhesion when applied to aluminum and glass, the adhesion to a nitrile- or neoprene-based rubber was considered only fair, in that the coating could be peeled away from the substrate. This patent also teaches using the silane as a primer layer over which a solubilized fluoroelastomer gum is applied.

Up until the present invention, direct cohesive bonding between a fluoroelastomer and a silicon rubber in the absence of an intervening primer or adhesive layer has not been considered practical because of the inherent inability of both fluorocarbon polymers and silicone rubber to strongly adhere to other surfaces. The prior art teaches that a variety of materials can be used as primers, adhesives or modifiers to achieve bonding between a silicone rubber and fluorine-containing organic polymers. U.S. Pat. No. 3,945,773 to A. Panagrossi et al., issued on July 19, 1960, discloses employing a finely divided mixture of a solid fluorinated polymer and a solid natural or silicone rubber as an adhesive for bonding a layer of fluorinated polymer to a substrate of a dissimilar material, such as a silicone rubber. A layer of finely divided rubber particles is placed between the aforementioned adhesive mixture and the solid rubber substrate.

The prior art teaches the addition of various materials to an uncured silicone rubber formulation in order to improve the adhesion between the cured rubber and other surfaces. For example, U.S. Pat. No. 4,082,726 to Mine et al., issued on Apr. 4, 1978, discloses an uncured organopolysiloxane composition containing (1) an organopolysiloxane having at least two lower alkenyl groups per molecule, (2) an organopolysiloxane having at least two silicon-bonded hydrogen atoms per molecule, (3) an organopolysiloxane having at least one epoxide group per molecule and (4) a suitable catalyst. Mine et al. teach that such compositions can be applied to a variety of substrates and subsequently cured to yield adherent coatings. The teaching of this reference would not be applicable to bonding a previously cured silicone rubber to other substrates or to bonding uncured rubbers that are curable by means other than the reaction of ethylenically unsaturated hydrocarbon groups with silicon-bonded hydrogen atoms.

The use of primer compositions containing silanes or polysiloxanes having epoxy and/or vinyl groups in the molecule for the purpose of adhering silicone rubbers to various substrates is disclosed in Japanese Patent Publication No. 3,127/79, published on Jan. 11, 1979, U.S. Pat. No. 3,619,256, issued on Nov. 9, 1971, U.S. Pat. No. 4,332,844 to Hamada et al., issued on June 1, 1982 and U.S. Pat. No. 4,122,127 to Mikami et al., which issued on Oct. 24, 1978. Such primer coatings are undesirable, since they require additional steps in the process for preparing coated silicone rubber articles. Many coatings require the use of organic solvents which must subsequently be recycled or disposed of.

British Pat. No. 1,092,857 teaches applying aqueous solutions or dispersions of hydrolyzed alkoxysilanes containing at least one epoxy group to the surface of a silicone rubber substrate to achieve bonding between the rubber substrate and a substrate formed from a polyamide or polyester resin. This method requires hydrolyzing an alkoxy-substituted epoxyalkyl silane, dissolving or dispersing the hydrolyzate in water and applying the resultant composition to the surface of a silicone rubber article prior to contacting the rubber with the resin.

One objective of this invention is to provide silicone rubber substrates coated with a cured fluoroelastomer, wherein the coating and substrate are cohesively bonded in the absence of an intervening layer of primer or adhesive.

A second objective of this invention is to provide a method for adhering a peroxide-curable fluoroelastomer gum to a cured or peroxide-curable silicone rubber without the use of a separate primer or adhesive as taught in the prior art.

SUMMARY OF THE INVENTION

One aspect of this invention pertains to coated silicone rubber articles that are prepared by contacting at least one surface of a cured or peroxide-curable silicone rubber composition with a peroxide-curable fluoroelastomer composition containing, in addition to a fluoroelastomer gum, (1) an epoxide compound in an amount sufficient to react with the acidic by-products produced during curing of the fluoroelastomer and (2) an organic peroxide in an amount sufficient to cure the fluoroelastomer. The resultant composite is heated to achieve curing of the fluoroelastomer gum and any peroxide-curable silicone rubber. The composition optionally contains one or more conventional curing agents for the purpose of improving the physical properties of the fluoroelastomer.

DETAILED DESCRIPTION OF THE INVENTION

This invention provides an article of manufacture comprising a silicone rubber substrate having a cured coating on at least one surface thereof, said coating being cohesively bonded to the substrate and comprising in the uncured state (a) a peroxide-curable, fluoroelastomer gum wherein the repeating units are derived from the polymerization of at least one fluorine-containing ethylenically unsaturated organic compound, (b) an amount of an organic peroxide sufficient to achieve curing of said fluoroelastomer gum and (c) an amount of an epoxide compound sufficient to react with the acidic by-products evolved during curing of said gum.

The Silicone Rubber

If the silicone rubber substrate is cured prior to application of the coating composition containing the peroxide-curable fluoroelastomer gum, the silicone rubber can be any of those known in the art. Representative types of rubbers are commercially available.

A preferred class of silicone rubbers includes polydiorganosiloxanes wherein the hydrocarbon groups bond to silicon are alkyl containing from 1 to 8 carbon atoms, alkenyl containing from 1 to 8 carbon atoms, fluoroalkyl containing from 1 to 8 carbon atoms and/or phenyl. Preferably these hydrocarbon groups are methyl, vinyl, phenyl and/or 3,3,3-trifluoropropyl. These rubbers are curable at room temperature or at elevated temperatures of up to 200° C. using a variety of curing agents and/or catalysts.

One type of silicone rubber can be cured at ambient temperatures in the presence of atmospheric moisture or oxygen. These are often referred to as "one-package" or "two package" room temperature vulcanizable or "RTV" compositions. A typical one-package RTV system contains a relatively low molecular weight polydiorganosiloxane having hydroxyl or readily hydrolyzable end groups and a silane containing at least three hydrolyzable groups, such as alkoxy or acyloxy, bonded to each silicon atom. Some of these compositions require a catalyst to achieve the desired cure. These compositions often contain a filler, a pigment and/or additives to control the rate or extent of the curing reaction.

An example of a "two-package" RTV composition employs the reaction of a vinyl-endblocked polydiorganosiloxane with a siloxane containing two or more silicon-bonded hydrogen atoms per molecule. The reaction occurs in the presence of a noble metal catalyst such as platinum or palladium or a compound of these metals.

The second major class of silicone rubbers are those requiring heating to temperatures above about 100° C. to initiate the curing reaction. One type of high temperature vulcanizable (HTV) rubber usually contains a relatively high molecular weight hydroxyl- or vinyl-terminated polydiorganosiloxane, typically in the form of a highly viscous semi-solid referred to as a "gum," a reinforcing filler such as fumed silica, and an organic peroxide that decomposes at elevated temperatures to yield free radicals that initiate the curing reaction. The silica filler is often treated with low molecular weight silanes or siloxanes containing hydroxyl or hydrolyzable groups to prevent a phenomenon referred to in the art as "crepe aging."

A second type of HTV formulation typically contains a gum having terminal vinyl groups, a treated silica filler, a polysiloxane containing at least two silicon-bonded hydrogen atoms per molecule and a platinum compound as the reaction catalyst.

While all of the aforementioned types of silicone rubbers are suitable for coating with the improved fluoroelastomer compositions of this invention, various considerations, such as economy and ease of processing, may indicate a preference for a particular type of curable silicone rubber formulation. It may be preferable to employ one of the high temperature vulcanizable silicone rubber formulations when preparing the coated composites of this invention. This is particularly advantageous if one desires to cure both the silicone rubber and fluoroelastomer in a single operation.

A complete discussion of the various types of silicone rubbers is contained in chapter 8 of a text by Walter Noll entitled "Chemistry and Technology of Silicones" [English language translation published by Academic Press, New York, N.Y. (1968)]. The entire text, including chapter 8, is hereby incorporated by reference as a teaching of various types of silicone rubbers and methods for their preparation and curing.

The silicone rubber formulations employed to prepare the coated articles of this invention can contain one or more conventional additives, including reinforcing or extending fillers, antioxidants, pigments and stabilizers. A preferred class of silicone rubbers is transparent and can be prepared in accordance with the teaching of U.S. Pat. No. 3,677,877 to Metevia et al. which issued on July 18, 1972, the relevant portions of which are hereby incorporated by reference. Other optically transparent silicone rubbers are described in U.S. Pat. Nos. 3,036,985; 3,094,446; 3,341,490 and 3,518,324.

Prior to being cured and coated with the peroxide-curable fluorocarbon elastomer, the uncured silicone rubber is fabricated into a shaped article using conventional equipment and techniques. If the silicone rubber is in the form of a gum, it can conveniently be fabricated into sheet form using a conventional rubber mill or calender rolls. More complex shaped articles such as tubing can be formed by molding or extrusion. Some uncured silicone rubber formulations, such as those disclosed in U.S. Pat. No. 4,162,243 to C. L. Lee et al. are sufficiently low in viscosity to be processable by injection molding.

The coated silicone rubber articles of this invention can be prepared by coating a shaped article of a cured or peroxide-curable silicone rubber with a peroxide-curable fluorocarbon elastomer in molten or solubilized form and subsequently curing the composite by heating it under conditions that will decompose the peroxide(s) present in the composition and impart the desired degree of curing.

Peroxide-curable silicone rubbers are well known materials and are available as viscous semi-solids or gums that can be cured using a wide range of temperatures and cure times. If the silicone rubber and fluorocarbon elastomer are to be cured concurrently, the only prerequisite governing the selection of suitable silicone rubber precursors and fluorocarbon elastomers is that they require the same combination of temperature and exposure time to achieve curing. It is preferable but not required that the same peroxide be present in both the silicone rubber precursor and curable fluoroelastomer gum composition.

The coated articles of this invention comprise a silicone rubber substrate having a cured fluorocarbon coating on at least one surface thereof. The coating is cohesively bonded to the substrate and comprises, in the uncured state, a fluoroelastomer composition as previously defined, which includes an amount of an epoxide compound sufficient to react with the acidic by-products generated during curing of the fluoroelastomer gum elastomer composition, an organic peroxide and, optionally, one or more reactants for curing the gum.

The Fluoroelastomer Composition

The fluoroelastomer gum used to coat the silicone rubber substrates of this invention are derived from one or more fluorine-containing ethylenically unsaturated organic compounds. As used in this specification and the accompanying claims, the term "fluoroelastomer gums" excludes polymers containing siloxane (SiO) groups.

Methods for preparing, compounding and curing peroxide-curable fluoroelastomer gums are discussed in the aforementioned article by R. G. Arnold et al. These methods are sufficiently well known to those skilled in this art that a complete discussion of the subject in this specification is not required. Fluoroelastomer compositions can be prepared by following the teaching contained in the aforementioned article by Arnold et al. and literature supplied by manufacturers of fluoroelastomer gums, and substituting an epoxide compound for the basic metal oxide present in prior art formulations. The concentration of epoxide compound should be sufficient to react with the acidic by-products generated when the fluorocarbon elastomer is cured.

Typically the fluorine-containing ethylenically unsaturated organic compounds employed to prepare fluoroelastomer gums contain from two to four carbon atoms. Compounds which have been polymerized to obtain commercially available fluorocarbon elastomers include vinylidene fluoride, hexafluoropropylene, tetrafluoroethylene and perfluoro(alkyl vinyl)ethers such as perfluoro(methyl vinyl)ether.

A preferred class of fluoroelastomer gums include copolymers of vinylidene fluoride and hexafluoropropylene that are designated by the manufacturer as being peroxide curable. Most preferably the elastomer contains a small concentration of untreated vinyl groups, which permits the curing reaction to be carried out at a lower temperature than would be required if the unreacted vinyl groups were not present. A typical fluoroelastomer gum of this preferred type is available under the trade name Viton ® GF from E. I. DuPont deNemours and Co., Wilmington, Del. The gum is cured using a "vinyl specific" peroxide such as 2,5-dimethyl-2,5-di(t-butylperoxy)hexane or dicumyl peroxide which are more desirable to use than a non-selective peroxide such as benzoyl peroxide.

The use of organic peroxides to cure fluoroelastomer gums is taught in U.S. Pat. No. 2,833,752, the relevant portions of which are hereby incorporated by reference. It will be understood that the choice of a particular peroxide, including those which react specifically with vinyl groups, will determine the conditions of temperature and exposure time required to adequately cure the gum.

In accordance with one embodiment of this invention, commercially available peroxide-curable fluoroelastomer gums are cured at temperatures of from 100° to 200° C., depending upon the decomposition temperature of the peroxide. The time required to achieve curing may range from 0.5 to 1 hour or longer. In some instances it may be desirable to post-cure the elastomer for up to 5 hours at temperatures of from 200° to 300° C. to optimize physical properties.

The concentration of peroxide should preferably be maintained at the lowest level that will achieve a useful cure rate and extent of cure. Larger amounts of peroxide have been shown to adversely affect the physical and optical properties of the cured elastomer. It is therefore preferable that the concentration of organic peroxide be from 0.1 to 1%, based on the weight of fluorocarbon elastomer. A concentration of from 0.3 to 0.5% has been shown to be optimum for the formulations disclosed in the accompanying examples.

The Epoxide Compound

The curable fluoroelastomer compositions employed to prepare the coated silicone rubber substrates of this invention contain an epoxide compound in an amount sufficient to react with the acidic by-products formed during curing of the fluoroelastomer gum. As previously discussed, the prior art teaches using silanes or basic metal oxides, including alkaline earth metal oxides such as calcium and magnesium oxides for this purpose. The basic oxides render the elastomer compositing opaque and therefore cannot be used if transparency or optical clarity is a requirement for the final cured product, which is true for preferred embodiments of the present invention. In addition, these oxides are nonreinforcing solid fillers, and often adversely affect desirable physical properties, such as tensile strength and tear strength, exhibited by the cured fluorocarbon elastomer.

The epoxide compound can be any of those known in the art, so long as it is compatible with the fluorocarbon elastomer composition. As used herein the term "epoxide compound" includes organic compounds and organosilicon compounds wherein the epoxide group is bonded to adjacent carbon atoms of an aliphatic or cycloaliphatic hydrocarbon group. The various classes of organic epoxide compounds are discussed in great detail in a text called "Handbook of Epoxy Resins" by K. Lee and H. Neville, published by McGraw-Hill (1967). Organosilicon compounds containing epoxide groups are described in a subsequent portion of this specification.

The organic epoxide reactant may be saturated or unsaturated, aliphatic, cycloaliphatic, aromatic or hetrocyclic and may contain substituents such as ether groups and the like. The reactant may be a monomer or an epoxy-functional polymer. Polymers are available as liquids or solid resins.

Monomeric epoxide reactants include cyclohexene oxide and substituted derivatives thereof, styrene oxide and glycidyl ethers. Typical glycidyl ethers include methyl glycidyl ether, ethyl glycidyl ether, propyl glycidyl ether, phenyl glycidyl ether and allyl glycidyl ether. Di- and polyfunctional epoxide compounds are preferred for use in the compositions of this invention because of their ability to form crosslinked materials. Representative diepoxides include vinylcyclohexene dioxide, butadiene dioxide, 1,4-bis(2,3-epoxypropoxy)-benzene; 4,4'-bis(2,3-epoxypropoxy)diphenyl ether, 1,8-bis(2,3-epoxypropoxy)octane; 1,4-bis(2,3-epoxypropoxy)cyclohexene, the diglycidyl ethers of polyethylene glycols, the diglycidyl ethers of polypropylene glycols, isoprene diepoxide and bis(3,4-epoxy-6-methylcyclohexylmethyl)adipate.

The more complex organic epoxides include the well-known polyfunctional resins obtained by reaction of polyhydric phenols with either polyfunctional halohydrins, polyepoxides or mixtures thereof. Illustrative of polyhydric phenols utilized in making such resins are mononuclear phenols, such as resorcinol, hydroquinone and catechol, and polynuclear phenols, such as the various bis-phenols, including p,p'-dihydroxybenzophenone; 2,2-bis(p-hydroxyphenyl)propane; p,p'-dihydroxydiphenyl; p,p'-dihydroxy dibenzyl; bis(4-hydroxyphenyl)sulfone and 2,2'-dihydroxy-1,1'-dinaphthyl methane. Other suitable polyepoxides reactants are disclosed in U.S. Pat. No. 3,170,962. U.S. Pat. No. 2,592,560 provides a description of the reaction conditions used to synthesize these reactants. When reacting polyhydric phenols with halogen compounds any of the known halohydrins may be utilized. Examples of suitable halohydrins include 1-chloro-2,3-epoxypropane (epichlorohydrin), 1-bromo-2,3-epoxypropane, 1-fluoro-2,3-epoxypropane, bis(3-chloro,-2-hydroxypropyl)ethane, 1,4-dichloro-2,3-dihydroxybutane, 2-methyl-2-hydroxy-1,3-dichloropropane, bis-(3-chloro,-2-methyl,2-hydroxy propyl)ether and other dichlorohydrins derived from aliphatic olefins, mannitol, sorbitol and other alcohols. The proportions of reactants as well as reaction conditions involved in the polyhydric phenol-epihalohydrin synthesis are well-known and are described in detail U.S. Pat. Nos. 2,615,007 and 2,615,008. Of course, these polyepoxide resins may contain unreacted hydroxyl groups.

To facilitate processing of the fluoroelastomer composition, the epoxide compound is preferably liquid at ambient temperatures and is soluble in the composition throughout the desired range of proportions. Mixtures containing two or more epoxide compounds can be employed if desired. Solid epoxide compounds should be dissolved in a suitable solvent prior to being added to the fluoroelastomer composition.

One class of preferred organic epoxide compounds includes aliphatic and cycloaliphatic epoxides containing from 4 to 20 carbon atoms. Particularly preferred organic epoxide compounds contain 2 epoxide groups, each of which is bonded to a cycloaliphatic hydrocarbon group containing 5 or 6 carbon atoms. This class encompasses polycyclic cycloaliphatic epoxides wherein the two hydrocarbon rings are preferably independent and are joined by a bridging group containing at least one ester of ether linkage.

A second particularly preferred class of epoxide compounds includes epoxy-substituted silanes, most particularly those of the general formula

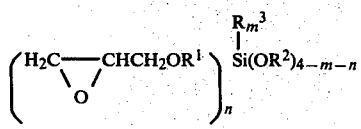

In the foregoing formula, $R^1$ represents alkylene containing from 1 to 8 carbon atoms, $R^2$ represents a lower alkyl group and preferably contains from 1 to 4 carbon atoms, $R^3$ represents a hydrocarbyl group containing from 1 to 8 carbon atoms or a fluoroalkyl group containing from 1 to 4 carbon atoms, m represents 0 or 1 and n represents an integer from 1 to 3. In preferred embodiments of this invention $R^1$ contains 3 or 4 carbon atoms, $R^2$ is methyl or ethyl and $R^3$, if present, is methyl, phenyl or 3,3,3-trifluoropropyl. Most preferably m is 0, n is 3, $R^1$ is n-propylene and $R^2$ is methyl.

The use of epoxy-substituted silanes is preferred because these silanes not only react with the acidic by-products generated during curing of the fluorocarbon elastomer but also function to increase the strength of the bond between the cured fluorocarbon elastomer and silicone rubbers when the fluorocarbon elastomer is used as a coating on silicone rubber substrates. In addition, the presence of certain epoxide-substituted silanes will yield a transparent cured elastomer.

Silanes containing a single epoxide group are exemplified in U.S. Pat. No. 3,445,877. Silanes having two or more epoxide groups per molecule are disclosed in U.S. Pat. Nos. 3,223,577 and 3,516,965. All of these patents are hereby incorporated by reference.

The concentration of epoxide compound is considered critical with regard to optimizing the physical properties of the cured fluorocarbon elastomer. These properties are optimized when the concentration of epoxide compound is from about 0.1 to 1%, based on the weight of fluorocarbon elastomer. Using higher concentrations of epoxide not only increases the cost of the but may actually adversely affect some desirable physical and optical properties of the final cured product. This effect is demonstrated in the accompanying examples.

Optically transparent coated silicone rubber substrates constitute a preferred embodiment of the present invention. The light transmittance of the coated substrate is greater than about 80%, measured using the procedure described in ASTM test method D-1003-61, published by the American Society for Testing of Materials.

The aforementioned U.S. Pat. No. 4,323,603 to Donald Close discloses fluoroelastomer gum compositions containing an epoxysilane and the use of these compositions as coating materials for hydrocarbon- and nitrile-based rubbers. What this patent fails to teach, however, is the requirement for an organic peroxide in the gum composition to achieve a strong cohesive bond between a fluoroelastomer and a silicone rubber. None of the fluoroelastomer compositions exemplified in this patent contain an organic peroxide and an epoxyalkyl silane.

In addition to the organic peroxide and the epoxide compound, the peroxide-curable fluorocarbon elastomer composition may contain one or more polyfunctional reactants, referred to in the art as crosslinking agents, for the purpose of improving the physical properties, particularly tensile strength, hardness and modulus, of the final elastomer. Typical crosslinking agents for fluorocarbon elastomers contain tow or more ethylenically unsaturated hydrocarbon groups per molecule, and include esters derived from acrylic, methacrylic or other ethylenically unsaturated carboxylic acid with a polyfunctional alcohol or phenol. Representative compounds of this type include the ethylene glycol and propylene glycol esters of acrylic and methacrylic acids.

A preferred class of crosslinking agents contain three or more ethylenically unsaturated hydrocarbon groups, such as vinyl or allyl groups, bonded to a hetrocylcic ring structure. A particularly preferred crosslinking agent is 2,4,6-triallylisocyanurate. This compound has been recommended for use with some types of fluoroelastomers, and is conventionally employed at a concentration of from 0.1 to about 20 parts by weight per 100 parts of elastomer. Preferably the concentration of crosslinking agent is from 3 to 10 parts by weight. In accordance with a preferred method for preparing coated silicone rubber articles, the desired amount of a solution containing the curable fluoroelastomer, the epoxide compound, a sufficient amount of peroxide to cure the elastomer and, optionally, a curing agent such as 2,4,6-triallylisocyanurate, is applied by brushing, dipping, spraying or other known technique onto a cured or peroxide-curable silicone rubber substrate and the resultant coated substrate is placed in a press and heated under conditions that will cure the coating, and, if necessary, the silicone rubber, while cohesively bonding the coating and substrate together. The solvent employed for the fluorocarbon elastomer is not critical, so long as it will dissolve all of the components present in the fluoroelastomer composition and not adversely affect the silicone rubber substrate. Representative of the preferred solvents are aliphatic ketones such as methyl ethyl ketone and methyl isobutyl ketone.

If conventional spraying equipment is employed to apply the fluoroelastomer, the concentration of dissolved solids is preferably from 1 to about 20%, based on the weight of the solution. The optimum concentration range will be dependent, at least in part, on the viscosity of the fluorocarbon elastomer, the rate at which it is desired to apply the coating, and the method by which the coating is applied. Using a preferred fluoroelastomer available as Viton ® GF from E. I. DuPont de Nemours and Company, the optimum elastomer concentration range is from 1 to about 10% by weight.

The following examples describe preferred fluoroelastomer compositions and coated silicone rubber substrates. The examples are not intended as limitations on the scope of the present invention as defined in the accompanying claims. All parts and percentages are by weight unless otherwise specified.

The samples prepared and evaluated included fluoroelastomers in sheet form and as coatings on silicone rubber substrates. The fluoroelastomer samples were formulated using a warm two-roll mill. The resultant sheet was removed from the mill and cured by placing the sheet in a press for 15 minutes. The platens of the press were maintained at a temperature of 170° C.

EXAMPLE 1

This example demonstrates the improvement in physical properties achieved by substituting an epoxide compound for the basic metal oxide in a conventional peroxide-curable fluoroelastomer formulation. The formulation contained 100 parts of a peroxide-curable vinylidene fluoride-hexafluoropropylene copolymer identified as Fluorel ® 2460 by the manufacturer, 3M Corporation, and specified amounts of (1) a vinyl-specific peroxide, namely 2,5-dimethyl-2,5-di(t-butylperoxy)-hexane, (2) 2,4,6-triallyl isocyanurate (a conventional curing agent for fluorocarbon elastomers), and (3) two different epoxide compounds, namely dicyclopentadiene diepoxide and an epoxysilane, 3-glycidoxypropyltrimethoxy silane. The resultant compositions were formulated on a warm 2-roll mill and cured at 170° C. as described in the foregoing specification.

The composition of the initial elastomer formulations and the physical properties of the cured samples are summarized in the following Table 1. The samples identified by letters were employed as controls.

mer was a peroxide-curaable copolymer of vinylidene fluoride and hexafluoropropylene. The copolymer contained a sufficient concentration of ethylenically unsaturated hydrocarbon groups to facilitate curing with vinyl-specific peroxides. The copolymer was identified as Viton ® GF and was manufactured by E. I. DuPont de Nemours and Co. Each formulation tested contained 100 parts of the copolymer and 5 parts of 2,4,6-triallylisocyanurate as the curing agent. The amounts of 3-glycidoxypropyltrimethoxysilane (epoxysilane) and 2,5-di(t-butylperoxy)-2,5-dimethylhexane (peroxide) present together with the physical and optical properties of the cured elastomer are summarized in the following Table 2. The light transmittance of the samples was determined using the procedure described in

TABLE 1

| Sample No. | Controls | | | | | 1 | 2 | 3 | 4 | 5 | 6 |
| --- | --- | --- | --- | --- | --- | --- | --- | --- | --- | --- | --- |
| | a | b | c | d | e | | | | | | |
| Fluorocarbon elastomer (parts) | 100 | 100 | 100 | 100 | 100 | 100 | 100 | 100 | 100 | 100 | 100 |
| Curing agent (parts) | 0 | 0 | 6 | 6 | 5 | 0 | 6 | 5 | 5 | 5 | 5 |
| Dicyclopentadiene Diepoxide (parts) | 0 | 0 | 0 | 0 | 0 | 6 | 3 | 0.5 | 1 | 0 | 0 |
| Epoxysilane (parts) | 0 | 0 | 0 | 0 | 0 | 0 | 0 | 0 | 0 | 1 | 0.5 |
| Peroxide (parts) | 0 | 3 | 3 | 1 | 0.5 | 3 | 1 | 0.5 | 0.5 | 0.5 | 0.5 |
| Durometer (Shore A scale) | 47 | 23 | 51 | 52 | 48 | 38 | 58 | 54 | 53 | 53 | 55 |
| Modulus @ 100% elongation (MPa) | 0.69 | 0.37 | 0.92 | 0.89 | 0.77 | 0.75 | 1.1 | 0.98 | 1.1 | 1.1 | 1.1 |
| Modulus @ 200% elongation (MPa) | 0.76 | 0.43 | 1.46 | 1.19 | 0.94 | 0.92 | 2.02 | 1.46 | 1.92 | 1.92 | 2.05 |
| Modulus @ 300% elongation (MPa) | 0.83 | ND | 3.38 | 2.14 | 1.22 | 1.12 | 4.61 | 2.91 | 4.58 | 4.96 | 5.12 |
| Tensile strength (MPa) | 0.76 | 0.43 | 4.5 | 6.51 | 2.94 | 3.72 | 4.39 | 3.51 | 4.58 | 7.30 | 6.49 |
| Elongation at break (%) | 365 | 215 | 330 | 460 | 497 | 573 | 287 | 327 | 300 | 347 | 327 |

ND = value not determined
MPa = megapascals

A comparison of the properties of samples a and b demonstrates that an elastomer cured using the peroxide in the absence of a curing agent (Sample b) exhibits physical properties which are substantially inferior to those of a sample cured in the absence of the peroxide (Sample a). The physical properties achieved using less perioxide, the curing agent and a silicon-free epoxide compound (sample 2) are superior to the properties of a sample having a higher peroxide content and no epoxide compound (sampe c). Substituting an epoxysilane for the silicon-free epoxide of sample 4 (sample 5), results in a substantial increase in the modulus value at 200 and 300% elongation and the elongation at break. Reducing the concentration of epoxysilane from 1 part (sample 5) to the preferred value of 0.5 part (sample 6) per 100 parts of elastomer yields an increase in the hardness (durometer value) and the modulus at 200 and 300% elongation.

EXAMPLE 2

This example demonstrates the effect of peroxide concentration and epoxysilane concentration on the physical and optical properties of a preferred type of fluorocarbon elastomer. Samples were prepared using the procedure described in example 1 and the preceding specification. In this instance the fluorocarbon elasto- ASTM Test Method D-1003-61 using a Hunter Lab Model D55H hazemeter manufactured by Hunter Associates Laboratory, Fairfax, Va. The samples identified as f and g were controls.

TABLE 2

| Sample No. | Controls | | 7 | 8 | 9 | 10 | 11 | 12 |
| --- | --- | --- | --- | --- | --- | --- | --- | --- |
| | f | g | | | | | | |
| Peroxide (parts) | 0.5 | 1.0 | 0.5 | 1.0 | 0.5 | 1.0 | 0.5 | 0.3 |
| Epoxysilane (parts) | 0 | 0.5 | 0.5 | 0.5 | 1.0 | 1.0 | 0.5 | 0.3 |
| Sample Thickness (mm) | 0.069 | 0.067 | 0.084 | 0.069 | 0.064 | 0.076 | 0.17 | 0.16 |
| Durometer (Shore A) | 60 | 60 | 58 | 60 | 62 | 60 | 54 | 50 |
| Modulus @ 100% elongation (MPa) | 1.12 | 1.19 | 1.31 | 1.42 | 1.08 | 1.29 | 1.12 | 1.15 |
| Tensile strength (MPa) | 5.81 | 5.84 | 5.03 | 4.60 | 3.31 | 4.50 | 5.76 | 6.36 |
| Transmittance (%) | 89.2 | 82.7 | 89.7 | 88.0 | 86.5 | 84.6 | 80.7 | 84.8 |

A comparison of the properties exhibited by samples f and 7 reveals that addition of 0.5 part of epoxysilane to a composition containing 0.5 part of peroxide improved the modulus, decreased the tensile strength and did not significantly affect the light transmittance. When the peroxide concentration was increased from 0.5 to 1.0 part using 0.5 part of the epoxysilane (sampe 8) the durometer was not affected, the modulus increased substantially and the tensile strength and light transmittance decreased relative to control sample f. Interchanging the amounts of peroxide and epoxysilane (sample 9) adversely affected the modulus, tensile strength and light transmittance relative to sample 8. Of the samples exhibiting similar thicknesses, sample 7 had the optimum combination of desirable physical properties and light transmittance. Increasing either the peroxide or epoxysilane content adversely affected light transmittance, tensile strength and modulus.

The data from samples 11 and 12 demonstrate that for thicker coatings the content of peroxide and epoxysilane can be decreased to 0.3 part per 100 parts of fluorocarbon elastomer to achieve an improvement in light transmittance modulus and tensile strength and only a small decrease in durometer value (hardness).

EXAMPLE 3

This example demonstrates the utility of peroxide-curable compositions containing an epoxysilane as transparent, abrasion-resistant coatings for three types of transparent silicone rubber formulations.

Formulation A included a dimethylvinyl terminated polydiorganosiloxane gum comprising dimethylsiloxy, diphenylsiloxy and methylvinylsiloxy groups, fumed silica, an anti-crepe aging additive and 2,5-dimethyl-2,5-di(t-butylperoxy)hexane.

Formulation B included a gum comprising dimethylvinyl, dimethyl and methylvinyl groups, a reinforcing silica filler and 2,5-dimethyl-2,5-di(t-butylperoxy)hexane.

Formulation C included a polydiorganosiloxane gum comprising dimethylhydroxy endblocks, 3,3,3-trifluoropropylmethylsiloxy and methylvinylsiloxy groups, a reinforcing silica filler and 2,5-dimethyl-2,5-di(t-butylperoxy)hexane.

Coating Procedure I—In accordance with this procedure, a film of a fluoroelastomer was formed on a rigid sheet of polytetrafluoroethylene. The film was subsequently transferred during a molding process to a silicone rubber substrate.

Two sheets of polytetrafluoroethylene, measuring about 8 by 10 inches (20 by 25 cm), were coated by spraying one side of each sheet with a 5% by weight solution of a vinylidene fluoride-hexafluoropropylene copolymer (Viton ® GF), in methyl isobutyl ketone and allowing the solvent to evaporate. The solution also contained 5 parts of triallyl isocyanurate, 0.5 parts of 3-glycidoxypropyltrimethoxy silane and 0.5 part of 2,5-dimethyl-2,5-di(t-butylperoxy)hexane, all parts being based on 100 parts by weight of the copolymer.

Each of the aforementioned three silicone rubber formulations, A, B and C, was pressed at ambient temperature to form a sheet having a surface measuring 4.25 by 7.25 inches (10.80 by 18.42 cm) and a thickness of 0.1 inch (0.25 cm). Each side of the resultant sheet was then placed in contact with the coated side of one of the two aforementioned polytetrafluoroethylene sheets. The resultant composite was then placed between two chromium-plated steel plates and the final five layer composite was placed in a hydraulically operated press and heated under pressure for 15 minutes. The platens of the press were maintained at a temperature of from 170° to 175° C.

The resultant fluoroelastomer-coated silicone rubber was removed from the press and separated from the two polytetrafluoroethylene sheets. The coated substrate was then post cured for 1 hour at a temperature of 200° C.

Coating Procedure 2—Samples of the three aforementioned silicone rubber formulations (A, B and C) were milled into 0.08–0.1 inch (2.0–2.5 cm)-thick sheets, cured at 170°–175° C. for 15 minutes under pressure and postcured for 1 hour in a circulating air oven at a temperature of 200° C. The resultant sheets, which measured 4.25 by 7.25 inches (10.8 by 18.4 cm) were coated by dipping them into the solubilized fluoroelastomer composition described in the first part of this example, the only difference being that the concentration of the fluorocarbon copolymer was 20% by weight. The sheet was lifted out of the solution at a rate of one inch (2.5 cm) per minute. The coated samples were dried under ambient conditions for 30 minutes and then placed for 20 minutes in a circulating air oven maintained at a temperature of 200° C.

The samples coated using the two foregoing procedures were evaluated in accordance with the following test methods. The data from these tests were summarized in the accompanying tables 3 and 4.

1. Transparency Test

This was a subjective test during which the optical transparency of a coated sample was compared visually with the transparency of the same uncoated rubber by attempting to distinguish objects viewed through the sample. The coated samples were rated in accordance with the following scale:

10—Transparency of coated and uncoated samples equivalent

9—Coated sample transparent, but slightly more hazy than uncoated sample

8—Considerable obstruction of visibility through coated sample relative to uncoated sample due to cloudiness

2. Talc Test

This test determines the ability of foreign particles such as dirt to adhere to the coated surface of the rubber. Talc (USP grade) was shaken onto the coated surface of the sample and the sample was then shaken to remove the excess talc. The coated surface of the sample was then wiped with tissue paper to evenly distribute the remaining talc over the surface of the sample. The degree of haze was measured using ASTM test procedure D1003-61 as previously described for the light transmittance measurements. The haze value is reported as % haze per 0.25 cm of sample thickness. Following this measurement the sample was held under running water at a temperature of about 10° C. for about one minute while being rubbed with the fingertips. The sample was then dried and the % haze measured as previously described. The samples were then wiped with a tissue paper saturated with ethanol and then dried. A final haze measurement was taken using the dried sample.

3. Adhesion Test

The coated side of a silicone rubber sample was scored with a razor blade to a depth of about 0.02 inch (0.05 cm) to form a pattern of squares measuring approximately 0.1 in (0.3 cm) along each side. The coated side of a commercially available clear cellophane tape (Scotch ® Magic Tape) was pressed against the scored area and then rapidly pulled away. This procedure was repeated five additional times over the same area, at which time the tape was replaced with a fresh piece and the procedure was again repeated five times. Those samples from which no coating was removed were placed in boiling water for 30 minutes at which time the test was repeated. The amount of coating material removed from each sample was subjectively evaluated and the results appear in the accompanying Table 3. The rating system employed to evaluate adhesion was as follows:

| | |
|---|---|
| 10 Excellent | No coating removed following 30-minute water boil. |
| 8 Good | No coating removed after 10 tape |

|   |   | applications, some removal following boiling water test. |
|---|---|---|
| 6 | Fair | Partial removal of coating after 10 applications of tape, no boiling water test. |
| 4 | Poor | Partial removal of coating after 5 applications of tape, no boiling water test. |
| 2 | Very Poor | Most of the coating removed after several applications of tape, no boiling water test. |
| 0 | No adhesion | Coating lifts off during first removal of tape |

4. Abrasion Test

The coated side of samples exhibiting fair to good coating adhesion was rubbed at the same location for 20 cycles with the eraser of a commercially available No. 2 lead pencil. Each cycle consisted of an initial rub and a second rub over the same area in a direction that was about 180 degrees from the direction of the initial rub. The residue produced during this test was then removed from the surface of the sample using tissue paper. The following subjective rating system was employed in this test.

10—No discernable marks or scratches following 10 rubbing cycles
8—Slight marking or scratching visible following 10 rubbing cycles
6—Substantial marring and/or scratching of surface apparent following 10 rubbing cycles
4—Severe marring and/or scratching of surface apparent following 10 rubbing cycles
2—At least a portion of the coating is removed during 10 rubbing cycles

5. Solvent Resistance Test

A few drops of the solvent to be evaluated were placed on the coated side of the sample and left in contact with the surface for ten minutes. The solvent was replenished as necessary to replace losses due to evaporation. Any dissolution of the coating during the ten-minute exposure period was noted. The following rating system was employed.

| 10 | Excellent | No detectable effect on coating |
|---|---|---|
| 9-8 | Very Good | Only slight adverse effect, such as softening of film, was detected |
| 6 | Good | Minor defects such as surface "tackiness" or presence of a residual ring pattern following removal of solvent |
| 4 | Fair | Some coating could be rubbed off following removal of solvent, none removed during exposure period |
| 2 | Poor | Coating can be easily rubbed off during 10-minute exposure to solvent |
| 0 | Very Poor | Coating dissolves when solvent is applied. |

TABLE 3

| | | Evaluation of Coatings | | | | |
|---|---|---|---|---|---|---|
| | | Formulation A | | Formulation B | | Formulation C |
| | Test | I | II | I | II | I | II |
| 1. | Transparency | 9 | 9 | 9 | 9 | 8-9 | 8-9 |
| 2. | Adhesion | 10 | 10 | 10 | 10 | 10 | 8 |
| 3. | Abrasion | 8 | 9 | 8 | 9 | 9 | 9 |
| 4. | Solvent Resistance | | | | | | |
| | EtOH | 10 | 10 | 10 | 10 | 10 | 10 |
| | IPA | 10 | 10 | 10 | 10 | 10 | 10 |
| | Toluene | 10 | 10 | 10 | 10 | 10 | 10 |
| | Acetone | 4 | 4 | 4 | 4 | 4 | 4 |

I = Coating Procedure 1 - spraying
II = Coating Procedure 2 - dipping
ETOH = Ethanol
IPA = Isopropanol

TABLE 4

% Haze Values* Observed During Talc Test (ASTM D1003-61)**

| Testing Procedure | Uncoated Samples (Controls) | | | Coated by Spraying | | | Coated by Dipping | | |
|---|---|---|---|---|---|---|---|---|---|
| Steps | Form. A | Form. B | Form. C | Form. A | Form. B | Form. C | Form. A | Form. B | Form. C |
| 1 | 4.7 | 6.0 | 4.1 | 14.8 | 6.5 | 7.3 | 6.1 | 4.1 | 11.4 |
| 2 | 50.4 | 42.5 | 41.7 | 15.6 | 19.0 | 15.2 | 14.7 | 17.7 | 19.3 |
| 3 | 37.6 | 37.4 | 36.1 | 14.9 | 19.5 | 14.0 | 12.8 | 16.9 | 14.1 |
| 4 | 4.1 | 5.5 | 4.7 | 14.8 | 5.6 | 7.5 | 6.0 | 4.3 | 6.6 |

*Haze values reported as % haze per 100 mils (0.25 cm.) of sample thickness (ASTM D1003-61)
**Testing Procedure:
1. Haze as measured on initial coated sample
2. Talc was dusted on to sample, wiped off with tissue paper, haze measured
3. Sample held under running water and rubbed with fingertips, dried, haze measured
4. Sample wiped with tissue paper soaked with absolute ethanol, dried, haze measured The data from the talc test in Table 4 demonstrate the superior resistance to dirt adhesion exhibited by silicone rubber coated with cured fluoroelastomers in accordance with the present invention. All of the coated samples exhibited relatively low haze values following removal of talc with tissue paper (15–19% haze per 0.25 cm. of sample thickness, compared with 40–50% haze per 0.25 cm. of sample thickness for the uncoated silicone rubber).

All of the coated samples exhibited good to excellent ratings for transparency, coating adhesion and abrasion and exhibited excellent resistance to all solvents except acetone, which is known to partially dissolve cured fluoroelastomers.

EXAMPLE 4

This example demonstrates the requirement for both an epoxysilane and a peroxide in a fluoroelastomer composition in order to achieve good abrasion resistance when the fluoroelastomer composition is coated onto a silicone rubber substrate.

Three coated silicone rubber substrates were prepared using coating procedure 2 described in the preceding example 3. The concentration of the fluoroelastomer was 8% in two of the formulations rather than 20% by weight as in example 3 in order to achieve a thinner coating. The composition of the silicone rubber substrate corresponded to formulation B in the preceding example 3. After being dipped into the solubilized fluoroelastomer the coated substrates were dried for 30 minutes at 40° C. and then cured for 2 minutes at a temperature of 200° C.

Two of the three fluorocarbon compositions (h and i) were controls and contained 100 parts by weight of the fluoroelastomer (as an 8% by weight solution) and 0.5 part of either the epoxysilane or the peroxide described in the preceding example 3. A third formulation (13) contained 100 parts by weight of the fluoroelastomer as a 20% by weight solution and 0.5 part each of the aforementioned epoxysilane and peroxide.

All three cured coatings exhibited good adhesion to the silicone rubber substrate, however the two controls (h and i) had ratings of 6 in the abrasion test, whereas the sample containing both the epoxysilane and the peroxide exhibited a rating of 10. These results demonstrate the requirement for both an epoxysilane and a peroxide in the fluoroelastomer composition to obtain cured coatings that adhere well to silicone rubber substrates in addition to exhibiting good abrasion resistance.

That which is claimed is:

1. An article of manufacture comprising a silicone rubber substrate having a cured coating on at least one surface thereof, said coating being cohesively bonded to the substrate and comprising in the uncured state (a) a peroxide-curable fluoroelastomer gum wherein the repeating units are derived from the polymerization of at least one fluorine-containing ethylenically unsaturated organic compound, (b) an amount of an organic peroxide sufficient to achieve curing of said fluoroelastomer gum at a temperature of from 100° to 200° C. and (c) an amount of an epoxide compound sufficient to react with the acidic by-products evolved during curing of said fluoroelastomer gum.

2. An article according to claim 1 wherein the epoxide compound is selected from the group consisting of organic epoxide compounds and organosilicon compounds containing at least one epoxy group, the epoxide group being bonded to adjacent carbon atoms of an aliphatic or cycloaliphatic hydrocarbon group.

3. An article according to claim 2 wherein the epoxide compound is an organic compound containing at least two epoxy groups.

4. An article according to claim 3 wherein the epoxide compound contains 2 epoxy groups, each of which is bonded to a cycloaliphatic hydrocarbon group containing 5 or 6 carbon atoms.

5. An article according to claim 4 wherein the epoxide compound is cyclopentadiene diepoxide.

6. An article according to claim 2 wherein the epoxide compound is selected from epoxy-substituted silanes.

7. An article according to claim 6 wherein the epoxy-substituted silane is represented by the formula

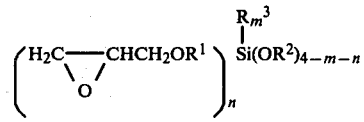

wherein $R^1$ represents alkylene containing from 1 to 8 carbon atoms, $R^2$ represents lower alkyl, $R^3$ represents a hydrocarbyl group containing from 1 to 8 carbon atoms or a fluoroalkyl group containing from 1 to 4 carbon atoms, m represents 0 or 1 and n represents an integer from 1 to 3 inclusive.

8. An article according to claim 7 wherein $R^1$ is n-propylene, $R^2$ is methyl, m is 0 and n is 1.

9. An article according to claim 1 wherein the concentration of epoxide compound is from 0.1 to 1%, based on the weight of said fluoroelastomer.

10. An article according to claim 1 wherein the fluorine-containing ethylenically unsaturated organic compound contains from 2 to 4 carbon atoms.

11. An article according to claim 10 wherein the fluorine-containing ethylenically unsaturated compound is selected from the group consisting of vinylidene fluoride, hexafluoropropylene, tetrafluoroethylene and perfluoro(alkyl vinyl)ethers.

12. An article according to claim 11 wherein the fluoroelastomer is a copolymer of vinylidene fluoride and hexafluoropropylene.

13. An article according to claim 2 wherein the organic peroxide is selected from the group consisting of vinyl-specific peroxides, benzoyl peroxide and dicumyl peroxide.

14. An article according to claim 13 wherein said vinyl-specific peroxide is 2,5-dimethyl-2,5-di(t-butylperoxy)hexane.

15. An article according to claim 1 wherein said coating in the uncured state contains at least one crosslinking agent selected from the group consisting of organic compounds containing three or more ethylenically unsaturated hydrocarbon groups.

16. An article according to claim 15 wherein said crosslinking agent is 2,4,6-triallylisocyanurate and is present at a concentration of from 0.1 to 10%, based on the weight of uncured fluorocarbon elastomer.

17. An article according to claim 1 wherein the silicone rubber in the uncured state is a peroxide-curable polydiorganosiloxane wherein the terminal groups are hydroxyl or vinyl.

18. An article according to claim 17 wherein the organic groups bonded to the nonterminal silicon atoms of said polydiorganosiloxane are selected from the group consisting of methyl, vinyl, phenyl and 3,3,3-trifluoropropyl.

19. An article according to claim 18 wherein the fluoroelastomer gum is a copolymer comprising vinylidene fluoride and hexafluoropropylene, the epoxide is dicyclopentadiene diepoxide or

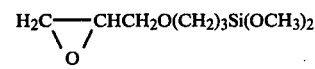

and is present at a concentration of from 0.1 to 1%, based on the weight of the uncured fluorocarbon elastomer, and the curable fluoroelastomer composition contains from 0.1 to 10%, based on the weight of fluoroelastomer gum, of a crosslinking agent selected from the group consisting of organic compounds containing three or more ethylenically unsaturated hydrocarbon groups.

20. An article according to claim 19 wherein the crosslinking agent is 2,4,6-triallylisocyanurate.

21. An article according to claim 19 or 20 wherein said article exhibits a light transmittance of greater than 80%.

* * * * *

UNITED STATES PATENT AND TRADEMARK OFFICE
CERTIFICATE OF CORRECTION

PATENT NO.  : 4,395,462
DATED       : July 26, 1983
INVENTOR(S) : Keith E. Polmanteer It is certified that error appears in the above-identified patent and that said Letters Patent is hereby corrected as shown below:

In column 2, line 61, "silicon" should read -- silicone --.

In column 7, line 35, "compositing" should read -- composition --.

In column 8, line 65, "of " should read -- or --.

In column 9, lines 39-40, "not only increases the cost of the" should read -- is not only more expensive --.

In column 9, line 68, "tow" should read -- two --.

In column 11, line 52, "(sampe c)" should read -- (sample c) --.

UNITED STATES PATENT AND TRADEMARK OFFICE
CERTIFICATE OF CORRECTION

PATENT NO. : 4,395,462

DATED : July 26, 1983

INVENTOR(S) : Keith E. Polmanteer

Page 2 of 2

It is certified that error appears in the above-identified patent and that said Letters Patent is hereby corrected as shown below:

In column 12, line 1, "peroxide-curaable" should read
-- peroxide-curable --.

In column 12, line 54, "(sampe 8 )" should read
-- (sample 8) --.

In column 14, line 51, "0.1 in" should read -- 0.1 in. --.

Signed and Sealed this

Twelfth Day of February 1985

[SEAL]

*Attest:*

DONALD J. QUIGG

*Attesting Officer*   *Acting Commissioner of Patents and Trademarks*

UNITED STATES PATENT AND TRADEMARK OFFICE
Certificate

Patent No. 4,395,462                                            Patented July 26, 1983

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Keith E. Polmanteer and James E. Jones.

Signed and Sealed this Eighteenth Day of March 1986.

BRADLEY R. GARRIS,
*Office of the Deputy Assistant
Commissioner for Patents.*